United States Patent
Frenger et al.

(10) Patent No.: US 10,779,225 B2
(45) Date of Patent: Sep. 15, 2020

(54) METHODS, NETWORK NODES AND WIRELESS DEVICE FOR HANDLING ACCESS INFORMATION

(71) Applicant: Telefonaktiebolaget LM Ericsson (publ), Stockholm (SE)

(72) Inventors: Pål Frenger, Linköping (SE); Erik Eriksson, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/769,796

(22) PCT Filed: Oct. 21, 2015

(86) PCT No.: PCT/SE2015/051117
§ 371 (c)(1),
(2) Date: Apr. 20, 2018

(87) PCT Pub. No.: WO2017/069668
PCT Pub. Date: Apr. 27, 2017

(65) Prior Publication Data
US 2018/0317159 A1    Nov. 1, 2018

(51) Int. Cl.
*H04W 48/16*    (2009.01)
*H04L 29/06*    (2006.01)
(Continued)

(52) U.S. Cl.
CPC ........... *H04W 48/16* (2013.01); *H04L 5/0053* (2013.01); *H04L 5/0096* (2013.01); *H04L 69/04* (2013.01);
(Continued)

(58) Field of Classification Search
CPC ..... H04W 48/06; H04W 48/08; H04W 48/16; H04W 52/0206; H04W 56/00;
(Continued)

(56) References Cited

U.S. PATENT DOCUMENTS 6,940,899 B2 * 9/2005 Heath ................ H03M 7/30
375/240
7,397,819 B2 * 7/2008 Kobayashi ........... H03M 7/30
370/469
(Continued)

FOREIGN PATENT DOCUMENTS

CN    101981994 A    2/2011
CN    103283283 A    9/2013
(Continued)

OTHER PUBLICATIONS

Frenger, et al., "A Clean Slate Radio Network Designed for Maximum Energy Performance", 2014 IEEE 25th International Symposium on Personal, Indoor and Mobile Radio Communications, 2014, pp. 1-5.
(Continued)

*Primary Examiner* — Tri H Phan
(74) *Attorney, Agent, or Firm* — Murphy, Bilak & Homiller, PLLC (57) ABSTRACT

Methods, network nodes (300, 304) of a radio network and a wireless device (302), for controlling operation of the wireless device (302) accessing the radio network. A signalling network node (300) obtains (3:2) an access parameter configuration. The access parameter configuration is one out of a compressed set of predefined access parameter configurations where different synchronization signals are associated with different access parameter configurations according to a predefined mapping such that a range of different synchronization signals are jointly mapped to an access parameter in the compressed set of predefined access
(Continued)

401 Obtain access parameter configuration for at least one wireless device

402 Obtain synchronization signal associated with the access parameter configuration according to predefined mapping 404 Signal synchronization signal to at least one wireless device parameter configurations. The signalling network node (300) further obtains (3:2) and signals (3:3) to the wireless device (302) a synchronization signal that is associated with the access parameter configuration according to said predefined mapping. The wireless device (302) is then enabled to derive said access parameter configuration from the compressed set of predefined access parameter configurations based on the signalled synchronization signal and the predefined mapping.

25 Claims, 6 Drawing Sheets

(51) Int. Cl.
*H04L 5/00* (2006.01)
*H04W 48/06* (2009.01)
*H04W 48/08* (2009.01)
*H04W 56/00* (2009.01)
*H04W 74/08* (2009.01)
*H04W 52/02* (2009.01)

(52) U.S. Cl.
CPC .......... *H04W 48/06* (2013.01); *H04W 48/08* (2013.01); *H04W 52/0206* (2013.01); *H04W 56/00* (2013.01); *H04W 56/001* (2013.01); *H04W 74/0833* (2013.01); *H04L 5/0087* (2013.01); *Y02D 30/70* (2020.08)

(58) Field of Classification Search
CPC .............. H04W 56/001; H04W 74/08; H04W 74/0833; H04W 4/06; H04W 72/00; H04W 28/06; H04W 72/04; H04W 72/0406; H04W 72/0446; H04W 72/0493; H04W 72/12; H04W 72/1263; H04L 5/00; H04L 5/0053; H04L 5/0087; H04L 5/0096; H04L 29/06; H04L 69/04; H04L 1/0007; H04L 5/0073; H04L 47/365; H04L 67/2828; Y02D 70/25; Y02D 70/00; Y02D 30/70; H04B 7/2656; H03M 7/30
See application file for complete search history.

(56) References Cited

U.S. PATENT DOCUMENTS

| | | | |
|---|---|---|---|
| 7,426,394 B2 | 9/2008 | Rinne | |
| 9,158,686 B2* | 10/2015 | Wegener | H03M 7/24 |
| 9,277,447 B2* | 3/2016 | Wei | H04L 5/001 |
| 9,462,539 B2* | 10/2016 | Frenger | H04W 74/006 |
| 9,668,162 B2* | 5/2017 | Frenger | H04W 4/70 |
| 9,854,465 B2* | 12/2017 | Zhu | H04W 52/325 |
| 9,860,803 B2* | 1/2018 | Mochizuki | H04W 36/04 |
| 9,894,624 B2* | 2/2018 | Yu | H04W 48/12 |
| 9,924,478 B2* | 3/2018 | Seo | H04W 56/00 |
| 9,992,736 B2* | 6/2018 | da Silva | H04W 48/18 |
| 10,098,055 B2* | 10/2018 | Frenger | H04W 48/12 |
| 10,244,494 B2* | 3/2019 | Yu | H04W 72/046 |
| 10,341,940 B2* | 7/2019 | Frenger | H04W 52/0219 |
| 2012/0014477 A1 | 1/2012 | Ko et al. | |
| 2013/0308555 A1 | 11/2013 | Ho | |
| 2014/0086173 A1 | 3/2014 | Sadeghi et al. | |
| 2014/0295836 A1 | 10/2014 | Frenger et al. | |
| 2014/0307621 A1 | 10/2014 | Frenger et al. | |
| 2015/0058879 A1 | 2/2015 | Park et al. | |
| 2015/0256995 A1 | 9/2015 | Rune et al. | |
| 2016/0142898 A1 | 5/2016 | Poitau et al. | |
| 2017/0150461 A1 | 5/2017 | Li et al. | |
| 2018/0063770 A1* | 3/2018 | Frenger | H04W 56/0015 |
| 2019/0021062 A1 | 1/2019 | Abedini et al. | |
| 2019/0387488 A1 | 12/2019 | Wang et al. | |

FOREIGN PATENT DOCUMENTS

| | | |
|---|---|---|
| CN | 104219757 A | 12/2014 |
| EP | 1901496 A1 | 3/2008 |
| EP | 2783534 A1 | 10/2014 |
| EP | 3269178 A1 | 1/2018 |
| JP | 2012533933 A | 12/2012 |
| JP | 2015528652 A | 9/2015 |
| WO | 2012051756 A1 | 4/2012 |
| WO | 2012092066 A1 | 7/2012 |
| WO | 2013077783 A1 | 5/2013 |
| WO | 2014036692 A1 | 3/2014 |
| WO | 2016144222 A1 | 9/2016 |

OTHER PUBLICATIONS

Frenger, Pal, et al., "From Always Available to Always Optimized", Towards 5G-5Green System Design, Aug. 27, 2014, pp. 1-28.
Unknown, Author, "5G—Key Component of the Networked Society", RWS-150009, 3GPP RAN Workshop on 5G, Phoenix, Arizona, USA, Sep. 17-18, 2015, pp. 1-55.
Unknown, Author, "Considerations on SIB for Low Complexity UEs", 3GPP TSG RAN WG2 Ad Hoc, R2-150241, CATT, Feb. 9-13, 2015, 1-6.
Unknown, Author, "System information acquisition for low complexity and coverage enhanced UEs", 3GPP TSG-RAN WG2 #89, Tdoc R2-150454, Ericsson, Feb. 9-13, 2015, 1-8.

\* cited by examiner

| Synchronization signal | AP1 | AP2 | ... |
|---|---|---|---|
| - - - | | | |
| $SSI_{11}$ | $AP1_{11}$ | $AP2_{11}$ | ... |
| $SSI_{12}$ | $AP1_{12}$ | $AP2_{12}$ | ... |
| $SSI_{13}$ | $AP1_{13}$ | $AP2_{13}$ | ... |
| - - - | | | |

Fig. 5A

| AP1 | $f_1(SSI_x)$ |
|---|---|
| AP2 | $f_2(SSI_x)$ |
| AP3 | $f_3(SSI_x)$ |
| - - - | - - - |

| Synchronization signal range | AP1 | AP2 | ... |
|---|---|---|---|
| SSI$_{16}$ - SSI$_{18}$ | $f_1(SSI_x)$ | AP2$_{16-18}$ | ... |

METHODS, NETWORK NODES AND WIRELESS DEVICE FOR HANDLING ACCESS INFORMATION

TECHNICAL FIELD

The present disclosure relates generally to signalling and broadcasting network nodes of a radio network, a wireless device and methods therein, for controlling access to the radio network in an area where the signalling network node provides radio coverage.

BACKGROUND

Different types of radio networks have been developed to provide radio communication for various wireless devices in different areas which are typically divided into cells or similar. The radio networks, also commonly referred to as wireless, cellular or mobile networks, are constantly improved to provide better capacity, quality and coverage to meet the demands from subscribers using services and increasingly advanced terminals for communication, such as smartphones and tablets, which often require considerable amounts of bandwidth and resources for data transport in the networks. Therefore, it is often a challenge to achieve high capacity and good performance, e.g. in terms of high data throughput, low latency and low rate of dropped calls or lost data, in the radio communication between network nodes in the radio network and various wireless devices communicating with the network nodes.

In the field of mobile or wireless communication, the term "wireless device" is often used and will be used in this disclosure to represent any communication entity capable of radio communication with a radio network by sending and receiving radio signals, such as e.g. mobile telephones, tablets and laptop computers. Another common term in this field is "User Equipment, UE" which thus corresponds to a wireless device. A wireless device in this context could also be a machine-to-machine type of device operating automatically such as a sensor, counter or measuring entity which is configured to send reports over the radio network e.g. at certain intervals or upon certain events. Further, the term "network node", is used here to represent any node of a radio network that is arranged to communicate radio signals with wireless devices. The network node in this context is often also referred to as a base station, radio node, eNodeB, eNB, base transceiver station, access point, etc.

In order to improve capacity and performance in the radio network, various features can be employed that are intended to make the radio communication more efficient in terms of resource usage. In particular, it is desirable to reduce energy consumption in the network as well as the amount of interference generated by transmissions made by network nodes and wireless devices, which in turn could improve both capacity and performance. It is for example desirable to limit the broadcasting of system information from network nodes, sometimes generally referred to as the "broadcast layer".

Figure 1:
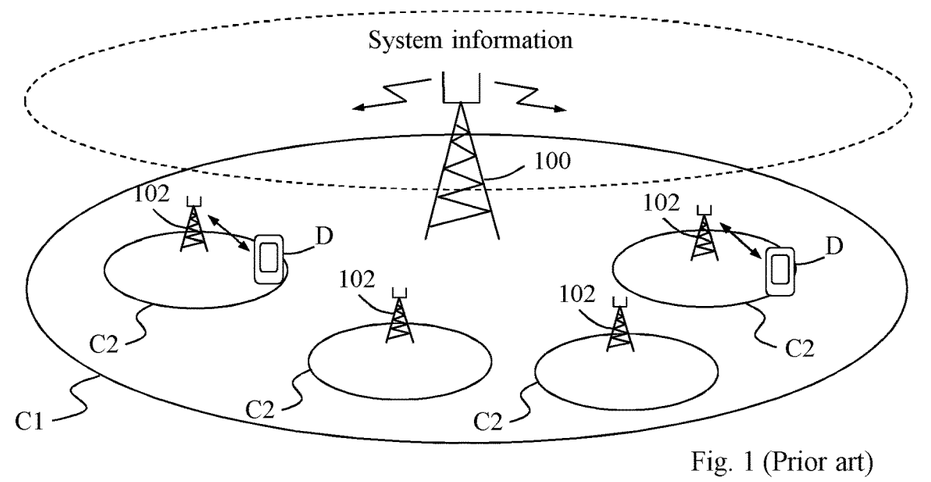
FIG. 1 illustrates a communication scenario where system information is broadcasted from a network node providing large radio coverage, and where wireless devices communicate data with network nodes providing smaller radio coverage, according to the prior art.

FIG. 1 illustrates a communication scenario in a hierarchical network structure comprising various network nodes including a so-called "macro" node 100 providing radio coverage over a relatively large area C1 and a plurality of further network nodes 102 providing radio coverage over much smaller areas C2 substantially within the area C1. The macro node 100 broadcasts system information over the large area C1 which can be read by any wireless devices D present in the area C1, e.g. to be used in order to communicate data with the network nodes 102 when present in any of the areas C2. Typically, system information needs to be broadcasted with higher power than what is required for transmitting data to a particular wireless device. This is because the broadcasted system information should be received properly by any wireless device that happens to be present within the large radio coverage area C1, including those that are located at the outskirts of the area C1, while transmitted data only needs to reach one specific device by using a transmit power and direction that can be regulated for proper reception by that device, e.g. within one of the smaller areas C2. It is estimated that around 99% of the total energy consumption for downlink transmissions in a radio network is typically generated by broadcasting system information.

One particular topic that has been addressed in this context is the broadcasting of access information containing parameter settings to be used in a procedure for accessing the network. For example, these parameter settings may be related to how wireless devices in idle mode should send random access messages on a Physical Random Access Channel, PRACH, and how the wireless devices can receive messages from the network such as the Random Access Response, RAR. Such access information thus relates to various parameters that can be used by wireless devices in the access procedure, e.g. frequency, synchronization, time window, preamble sequence in the PRACH message, power level, and so forth.

One common access procedure in this context is contention-based access where any wireless device can transmit a message to a serving network node on the PRACH without radio resources being reserved for that device in advance, at the risk of collision when two or more wireless devices happen to transmit simultaneously. Further access parameter settings that may be broadcasted for contention-based access may relate to a back-off timer, power increase step, maximum number of PRACH attempts before back-off, access restrictions e.g. related to certain closed subscriber groups comprising e.g. family members or employees allowed to access a certain network node such as a home base station, and service class or user type priority information such that when there is congestion on the PRACH only certain devices, or devices with certain service requests, are allowed to perform PRACH transmission attempts.

It has been proposed that the same access information should be broadcasted at regular intervals in a synchronized manner over a relatively large area, e.g. by a macro node or similar providing large radio coverage and/or simultaneously by several network nodes each providing smaller radio coverage, so as to reduce and minimize the total broadcast duration and avoid interference. The goal is to transmit as little as possible apart from data transmissions to individual devices. If there are no ongoing data transmissions in a particular cell or area, the network nodes of that area can turn off their transmitters between the broadcasting occasions and enter Discontinuous Transmission mode, commonly known as DTX, to save power and also to avoid interference in adjacent areas. Any idle wireless devices present in the area but not active in a call or session are in this case able to derive relevant access information from the broadcast access information based on a specific system signature index sequence, referred to as SSI, which is transmitted from a network node as a reference to a specific set of access parameters or a specific entry in the broadcast access information to be used when performing random access towards that network node.

However, different network nodes may need to apply different sets of access related parameters locally in different areas, depending on the current traffic situation in terms of ongoing data communications, the number of wireless devices present in a particular area, the number of random access messages currently being transmitted, and so forth. Moreover, the network nodes may need to switch rapidly between different sets of access related parameters, referred to as access parameter configurations, on a dynamic basis so as to adapt the access procedure e.g. to changes of the traffic situation. These issues have not been addressed properly and no solution is thus known at present to accomplish such flexible use of different access parameter configurations.

It is also a problem that the amount of broadcasted information becomes substantial when many access parameters and combinations thereof need to be communicated to different wireless devices, e.g. in the form of an extensive table referred to as the Access Information Table, AIT, in order to enable the above-mentioned selection of a suitable access parameter configuration for different areas on a dynamic basis. The broadcasting of such a large table or the like containing a great number of elements, i.e. parameter settings, results in high power consumption and potential interference.

SUMMARY

It is an object of embodiments described herein to address at least some of the problems and issues outlined above. It is possible to achieve this object and others by using a network node, a wireless device and methods therein, as defined in the attached independent claims.

According to one aspect, a method is performed by a signalling network node of a radio network, for controlling operation of at least one wireless device accessing the radio network in an area where the signalling network node provides radio coverage. In this method, the signalling network node obtains an access parameter configuration. The access parameter configuration is to be used by the at least one wireless device for accessing the radio network. Different synchronization signals are associated with different access parameter configurations in a compressed set of predefined access parameter configurations according to a predefined mapping between the different synchronization signals and the different access parameter configurations. The predefined mapping is such that a range of said different synchronization signals are jointly mapped to an access parameter in the compressed set of predefined access parameter configurations.

The signalling network node further obtains a synchronization signal that is associated with the access parameter configuration according to said predefined mapping, and signals the obtained synchronization signal to the at least one wireless device. Thereby, the at least one wireless device is enabled to derive said access parameter configuration from the compressed set of predefined access parameter configurations based on the signalled synchronization signal and said predefined mapping.

According to another aspect, a signalling network node is arranged to control operation of at least one wireless device accessing a radio network in an area where the signalling network node provides radio coverage. The signalling network node is operative to obtain an access parameter configuration. The access parameter configuration is to be used by the at least one wireless device for accessing the radio network. Different synchronization signals are associated with different access parameter configurations in a compressed set of predefined access parameter configurations according to a predefined mapping between the different synchronization signals and the different access parameter configurations. The predefined mapping is such that a range of said different synchronization signals are jointly mapped to an access parameter in the compressed set of predefined access parameter configurations.

The signalling network node is further operative to obtain a synchronization signal that is associated with the access parameter configuration according to said predefined mapping, and to signal the obtained synchronization signal to the at least one wireless device, to enable the at least one wireless device to derive said access parameter configuration from the compressed set of predefined access parameter configurations based on the signalled synchronization signal and said predefined mapping.

According to another aspect, a method is performed by a wireless device for accessing a radio network in an area where a signalling network node provides radio coverage. In this method, the wireless device receives from the signalling network node a synchronization signal that is associated with an access parameter configuration comprised in a compressed set of predefined access parameter configurations for accessing the radio network, wherein different synchronization signals are associated with different access parameter configurations in the compressed set of predefined access parameter configurations according to a predefined mapping between the different synchronization signals and the different access parameter configurations. The predefined mapping is such that a range of said different synchronization signals are jointly mapped to an access parameter in the compressed set of predefined access parameter configurations.

The wireless device then derives said access parameter configuration from the compressed set of predefined access parameter configurations based on the received synchronization signal and the predefined mapping, and accesses the radio network according to the derived access parameter configuration.

According to another aspect, a wireless device is arranged to access a radio network in an area where a signalling network node provides radio coverage. The wireless device is operative to receive from the signalling network node a synchronization signal that is associated with an access parameter configuration comprised in a compressed set of predefined access parameter configurations for accessing the radio network, wherein different synchronization signals are associated with different access parameter configurations in the compressed set of predefined access parameter configurations according to a predefined mapping between the different synchronization signals and the different access parameter configurations. The predefined mapping is such that a range of said different synchronization signals are jointly mapped to an access parameter in the compressed set of predefined access parameter configurations.

The wireless device is further operative to derive said access parameter configuration from the compressed set of predefined access parameter configurations based on the received synchronization signal and the predefined mapping, and to access the radio network according to the derived access parameter configuration.

According to another aspect, a method is performed by a broadcasting network node of a radio network, for controlling operation of at least one wireless device accessing the radio network in an area where a signalling network node provides radio coverage. In this method, the broadcasting network node broadcasts a compressed set of predefined access parameter configurations. Different synchronization signals are associated with different access parameter configurations in the compressed set of predefined access parameter configurations according to a predefined mapping between the different synchronization signals and the different access parameter configurations. The predefined mapping is such that a range of said synchronization signals are jointly mapped to an access parameter in the compressed set of predefined access parameter configurations.

According to another aspect, a broadcasting network node is arranged to control operation of at least one wireless device accessing a radio network in an area where a signalling network node provides radio coverage. The broadcasting network node is operative to broadcast a compressed set of predefined access parameter configurations. Different synchronization signals are associated with different access parameter configurations in the compressed set of predefined access parameter configurations according to a predefined mapping between the different synchronization signals and the different access parameter configurations. The predefined mapping is such that a range of said synchronization signals are jointly mapped to an access parameter in the compressed set of predefined access parameter configurations.

The above signalling and broadcasting network nodes, wireless device, and methods therein may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to reduce the amount of broadcasted access information in a radio network and yet allow for flexible and dynamic usage of different access parameter settings in different areas, to be used by wireless devices in a procedure for accessing the network. This may be accomplished by signalling different synchronization signals to wireless devices in different areas, which synchronization signals are associated with different predefined access parameter configurations which can be derived by the wireless devices according to a predefined mapping between the synchronization signals and a compressed set of predefined access parameter configurations. Each predefined access parameter configuration comprises a setting of different access parameter values.

In this solution, the predefined mapping is done such that the set of predefined access parameter configurations is compressed by jointly mapping a range of different synchronization signals to an access parameter in the compressed set of predefined access parameter configurations. Strictly speaking, the different synchronization signals discussed herein form a group of synchronization signals that may be seen as a range of different synchronization signals, either by the way some characteristic or identity of the synchronization signals changes, within a range, from one synchronization signal to another within the group, or in that each synchronization signal in the group is assigned a respective index within a range of different indices, so that a range of different synchronization signal indices represents the group of different synchronization signals. In the following, the group of different synchronization signals will be termed a range of different synchronization signal.

The range of different synchronization signals may be jointly mapped to one, more than one or multiple access parameters in the compressed set of predefined access parameter configurations. Also, there may be one range, more than one range or multiple ranges of different synchronization signals that are jointly mapped to the one, more than one or multiple access parameters in the compressed set of predefined access parameter configurations. Thereby, the amount of information comprised in the compressed set of predefined access parameter configurations will be smaller as compared to having a set of predefined access parameter configurations that is not compressed, i. e where the different synchronization signals are individually mapped to access parameter configurations. Advantages of using a compressed set of predefined access parameter configurations include that a smaller amount of information needs to be broadcasted by the network or preconfigured in the wireless devices. Some examples of how this mapping may be done will be described later below.

This way, different predefined access parameter configurations can be implemented or "enforced" in an efficient manner and on a dynamic basis in different areas, e.g. depending on a current traffic situation such as traffic intensity and number of active wireless devices, which may change rapidly, by signalling different synchronization signals which signals require relatively small amounts of radio resources. The solution will be described in terms of functionality in a signalling network node which may be any of the nodes 100 and 102 shown in FIG. 1.

Furthermore, the radio network can broadcast the same access information including the compressed set of predefined access parameter configurations, e.g. in the form of an Access Information Table, AIT, across different areas e.g. defined by one or more cells, sectors or antenna beams. It is assumed in this disclosure that a broadcasted AIT includes the compressed set of predefined access parameter configurations described herein. Alternatively or additionally, the compressed set of predefined access parameter configurations may have been preconfigured in the wireless devices. Also, the predefined mapping may have been preconfigured in the wireless devices, but it is also possible that the predefined mapping is broadcasted, for example in case an update of the predefined mapping is needed. By transmitting different synchronization signals in the different areas, e.g. in the form of System Signature Index (SSI) sequences, any wireless device can use a received synchronization signal for deriving currently valid access parameters to be used for accessing the network, depending on in which area the wireless device is located. An SSI is an index that may be used to represent or indicate a particular synchronization signal or SSI sequence.

Thus, different sets of access related parameters, i.e. access parameter configurations, can be implemented in different areas of the network in a flexible manner depending on which synchronization signal is signalled. Some illustrative but non-limiting examples of access parameters in such access parameter configurations may relate to frequency, synchronization, time window, PRACH preamble sequence, power level, back-off timer, power increase step, maximum number of PRACH attempts before back-off, access restrictions, and priority information related to service class or user type. These examples of access parameters have been mentioned and described above.

Figure 2:
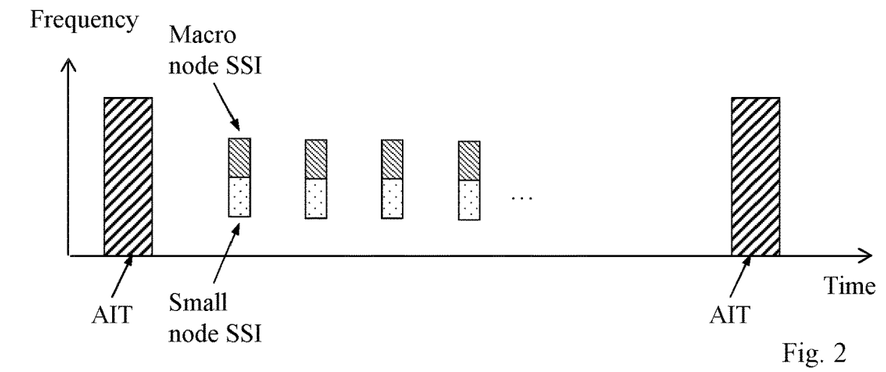
FIG. 2 is a diagram illustrating how access information can be provided from a radio network to wireless devices, according to a common procedure which may be used in this solution.

FIG. 2 illustrates schematically how the above-mentioned access information and synchronization signal can be broadcasted and signalled, respectively, by a radio network. In this example, the access information including the compressed set of predefined access parameter configurations is broadcasted in an AIT with a certain periodicity over time and the synchronization signal is signalled in an SSI with another periodicity that may be shorter than the periodicity of the AIT. Technically, time separation of AIT and SSI is not required and they may be separated in frequency as well, or by a combination of time/frequency/code. The periodicity of the AIT may be the same as for the SSI in some cases, e.g. when the network only contains one transmitting network node it may be desirable to transmit the AIT and SSI together at the same time.

The AIT may be broadcasted over a relatively large area, e.g. by a network node such as the macro node 100 over area C1 as shown in FIG. 1, and different SSIs may be transmitted in different smaller areas within the relatively large area, e.g. by different "smaller" network nodes such as the network nodes 102 over areas C2 as shown in FIG. 1. Alternatively, the different SSIs may be transmitted, e.g. by the same network node, in different directions such as over sectors or antenna beams.

Once a wireless device has received a synchronization signal such as an SSI in a particular area, it will be able to derive an associated access parameter configuration from the compressed set of predefined access parameter configurations according to the predefined mapping which is known in advance by the wireless device. This access parameter configuration and its parameter settings can then be used by the wireless device for accessing the radio network. The predefined mapping may be known by the wireless device e.g. after being received in broadcasted information or configured otherwise in the wireless device.

FIG. 2 further illustrates that the broadcasting of AIT and transmission of SSI are separated in time, and that SSI is transmitted with a considerably shorter periodicity than the broadcasted AIT such that the wireless device may receive the currently valid SSI before receiving the AIT. It is also shown that an SSI may be transmitted by both a macro node and by a "small" node. The AIT may be transmitted by both a macro node and smaller nodes as well. The SSI, or generally the synchronization signal, is effectively a "key" for deriving the correct and valid access parameters from the broadcasted access information, e.g. the AIT. For example, it may be desirable to broadcast any system information including access information, e.g. on a Physical Broadcast Channel, PBCH, in a so-called "Single Frequency Network", SFN, transmission format, which means that the same information is broadcasted over a large area. Different parts of this information can then be implemented in different areas on a dynamic basis by means of the synchronization signal.

Figure 3:
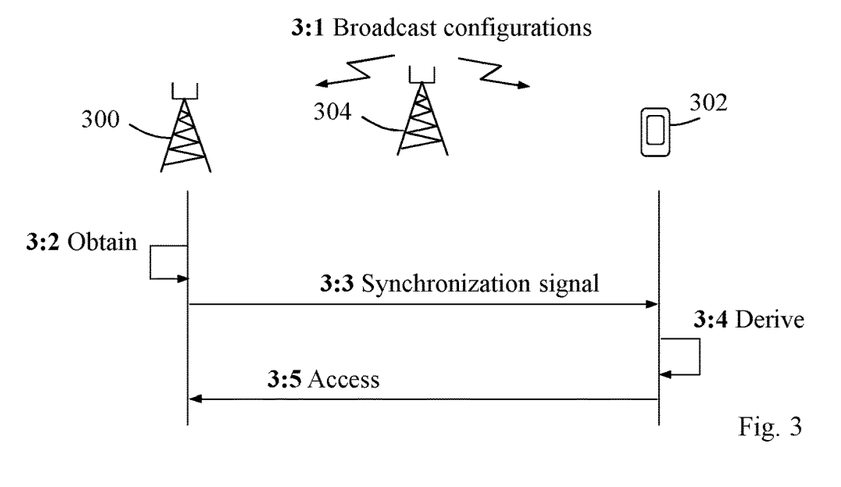
FIG. 3 is a signalling diagram illustrating an example of a procedure involving signalling and broadcasting network nodes and a wireless device when the solution is used, according to some possible embodiments.

FIG. 3 is a simplified signalling diagram illustrating how the solution may be used involving signalling and broadcasting network nodes 300 and 304, respectively, of a radio network and a wireless device 302 present in an area where the network node 300 provides radio coverage. In this example the network node 300 is illustrated as a base station or similar, although the solution is not limited thereto. A first action 3:1 illustrates that the broadcasting network node 304 broadcasts a compressed set of predefined access parameter configurations which the wireless device 302 may receive and save such that the compressed set of predefined access parameter configurations can be regarded as known to the wireless device 302. It is further assumed that the above-described predefined mapping is also known to the wireless device 302, e.g. by being preconfigured or obtained in a broadcast from the broadcasting network node 304, to mention a few examples. In a further action 3:2, the signalling network node 300 basically obtains a suitable access parameter configuration. The obtained access parameter configuration is one of the access parameter configurations comprised in the compressed set of predefined access parameter configurations.

This access parameter configuration may have been selected depending on the current traffic situation and it is to be used by the wireless device 302 for accessing the radio network in a manner that is thus adapted to the traffic situation which may include any ongoing data communications, the number of wireless devices present in the radio coverage area, the number of random access transmissions, the amount of interference generated, and so forth. Further, the selection of suitable access parameter configuration may be done by the signalling network node 300 itself or by another node in the network which other node in that case provides or indicates the selected access parameter configuration to the signalling network node 300. The other node may in some embodiments be the broadcasting network node 304, whereas in other embodiments it may be an operation and maintenance node in the radio network.

In action 3:2, the signalling network node 300 also obtains a synchronization signal that is associated with the obtained access parameter configuration according to said predefined mapping. The synchronization signal may be obtained by being provided to the signalling network node 300 by another node in the network, e.g. the broadcasting network node 304 or an operation and maintenance node in the radio network. The synchronization signal may alternatively be obtained by being determined by the signalling network node 300 from the predefined mapping. The signalling network node 300 may then have received the predefined mapping from another node in the network, such as the broadcasting network node 304 or the operation and maintenance node, for example via a backhaul interface. Furthermore, the signalling network node 300 may have received the compressed set of predefined access parameter configurations from another node in the network, such as the broadcasting network node 304 or the operation and maintenance node, for example via the backhaul interface. In embodiments where the synchronization signal is obtained by being provided to the signalling network node 300 by another node in the network, the signalling network node may then, as an example, obtain the access parameter configuration by deriving it the compressed set of predefined access parameter configurations based on the provided synchronization signal and using the predefined mapping.

In a next action 3:3, the signalling network node 300 signals the obtained synchronization signal to the wireless device 302, the synchronization signal being associated with the obtained access parameter configuration according to the predefined mapping between the synchronization signals and the access parameter configurations in said compressed set of predefined access parameter configurations. The term "predefined mapping" thus implies that this mapping is known to the wireless device, as mentioned above. Having received the synchronization signal and knowing the predefined mapping and the compressed set of predefined access parameter configurations, the wireless device 302 is then able to derive the associated access parameter configuration based on the received synchronization signal, in another action 3:4. This example also illustrates that the wireless device 302 finally accesses the radio network, e.g. by communicating with the signalling network node 300, according to the derived access parameter configuration, in a final action 3:5.

Figure 4A:
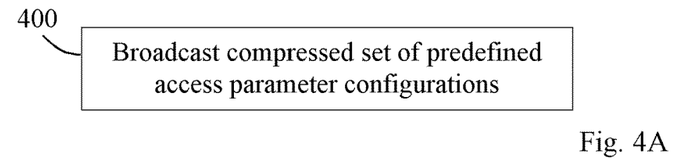
FIG. 4A is a flow chart illustrating a procedure in a broadcasting network node, according to further possible embodiments.

An example of how the solution may be employed in terms of actions performed by a broadcasting network node, will now be described with reference to the flow chart in FIG. 4A which illustrates how the broadcasting network node, such as the above broadcasting network node 304, may operate to accomplish the functionality described above. A "broadcasting network node" in this context may be a base station or equivalent, as illustrated in the example of FIG. 3, which operates to transmit and receive radio signals, but it may also be a control node in the network such as a network management node, a Radio Network Controller (RNC) or an Operation & Maintenance (O&M) node, which operates to control and instruct one or more base stations to communicate radio signals with wireless devices.

The broadcasting network node is arranged to control operation of at least one wireless device, such as the above wireless device 302, accessing the radio network in an area where a signalling network node provides radio coverage, such as a cell, sector or antenna beam. An action 400 illustrates that the broadcasting network node broadcasts a compressed set of predefined access parameter configurations, wherein different synchronization signals are associated with different access parameter configurations in the compressed set of predefined access parameter configurations according to a predefined mapping between the different synchronization signals and the different access parameter configurations such that a range of said synchronization signals are jointly mapped to an access parameter in the compressed set of predefined access parameter configurations.

An example of how the solution may be employed in terms of actions performed by a signalling network node, will now be described with reference to the flow chart in FIG. 4B which illustrates how the signalling network node, such as the above signalling network node 300, may operate to accomplish the functionality described above. The actions may be performed in any suitable order. For example, action 402 may be performed before action 401, so that the signalling network node first obtains a synchronization signal and then obtains an access parameter configuration associated with the obtained synchronization signal according to the predefined mapping.

The signalling network node is arranged to control operation of at least one wireless device, such as the above wireless device 302, accessing the radio network in an area where the signalling network node, such as the above signalling network node 300, provides radio coverage, such as a cell, sector or antenna beam. A "signalling network node" in this context may be a base station or equivalent, as illustrated in the example of FIG. 3, which operates to transmit and receive radio signals, but it may also be a control node in the network such as a network management node, a Radio Network Controller (RNC) or an Operation & Maintenance (O&M) node, which operates to control and instruct one or more base stations to communicate radio signals with wireless devices. In some embodiments, the signalling network node is also the broadcasting network node. In other embodiments the signalling and broadcasting network nodes are separate nodes.

A first action 401 illustrates that the signalling network node obtains an access parameter configuration, which access parameter configuration is to be used by the at least one wireless device for accessing the radio network. As described above, the obtained access parameter configuration is one of a number of different access parameter configurations comprised in a compressed set of predefined access parameter configurations which is known to the at least one wireless device, and different synchronization signals are associated with the different access parameter configurations in the compressed set of predefined access parameter configurations according to a predefined mapping between the different synchronization signals and the different access parameter configurations such that a range of said different synchronization signals are jointly mapped to an access parameter in the compressed set of predefined access parameter configurations. In a possible embodiment, the obtained access parameter configuration may have been selected depending on a current traffic situation in the area, e.g. in the manner described above. As further mentioned above, the access parameter configuration may have been selected by the signalling network node itself or by another node in the network depending on the implementation.

In a next action 402, the signalling network node obtains a synchronization signal that is associated with the access parameter configuration according to the predefined mapping. Some examples of how this mapping between synchronization signals and access parameter configurations may be realized will be described later below with reference to FIGS. 5A, 5B and FIGS. 6A, 6B.

In one possible embodiment, the predefined mapping may comprise a table which maps the different synchronization signals to corresponding ones of the different access parameter configurations such that said range of different synchronization signals are mapped to either one value of the access parameter or to a sub-table where the synchronization signals comprised in said range of different synchronization signals are mapped to respective values of the access parameter. For example, the table may comprise entries for different synchronization signal indices and the access parameter configurations associated with the synchronization signals represented by the synchronization signal indices. Thereby, a synchronization signal may, via such an entry, be mapped to a set of specified access parameters in the associated access parameter configuration. In this embodiment, it is also possible to map more than one synchronization signal, e.g in form of a range of different synchronization signals represented by a range of different synchronization signal indices, to the same access parameter configuration.

In another alternative or additional embodiment, the predefined mapping may comprise a function of the range of different synchronization signals for determining, for each synchronization signal in the range of different synchronization signal respective values of the access parameter in the compressed set of predefined access parameter configurations. The function may use as an input or argument the synchronization signal indices representing the synchronization signals in the range of different synchronization signals, for determining, for each synchronization signal in the range of different synchronization signals, respective values of the access parameter for respective associated access parameter configurations in the compressed set of predefined access parameter configurations. In this case, there may be a function specifically defined for each of one or more particular access parameters such that each access parameter "AP" can be derived by computing that function "f" using the synchronization signal index representing the synchronization signal, e.g. SSI, as input, i.e. basically in the manner of AP=f(SSI). In this latter embodiment using a function, it is possible to map several synchronization signals, e.g. in form of a range of different synchronization signals, represented by a range of different synchronization signal indices, to a single function for deriving respective values of a certain access parameter in the access parameter configuration.

In a next action 404, the signalling network node signals the obtained synchronization signal to the at least one wireless device. In a possible embodiment, the signalling network node may signal the obtained synchronization signal to the at least one wireless device by broadcasting or by dedicated signalling. Thereby, the at least one wireless device is enabled to derive said access parameter configuration, i.e. the one obtained in action 401, from the compressed set of predefined access parameter configurations based on the signalled synchronization signal and said predefined mapping. This access parameter configuration can then be used by the wireless device(s) for accessing the radio network in the area.

In this way, it is possible to implement a particular suitable access parameter configuration in the area simply by signalling a synchronization signal that is associated with that access parameter configuration to the wireless device(s) being located in the area. It is an advantage that signalling the synchronization signal requires considerably less radio resources and thus generates less interference, as compared to signalling the entire access parameter configuration. For example, the reduced amount of radio resources required for signalling may enable an access parameter configuration to be selected that is adapted to, or even optimized for, a current traffic situation in the area such that the performance in that area can be generally improved and/or optimized. Another advantage is that the compressed set of predefined access parameter configurations is of smaller size than if the same information were uncompressed, which thus requires less radio resources when broadcasted by the network and less space when stored in the wireless device(s) and/or in the network nodes. Some further possible embodiments will be outlined below.

In another possible embodiment, different synchronization signals may be signalled in different areas, sectors or antenna beams to implement corresponding associated access parameter configurations in said different areas, sectors or antenna beams. Thereby, the access procedure can be adapted or optimized individually and locally in the different areas, sectors or antenna beams which may improve the overall performance in the radio network e.g. in terms of radio resource utilization and interference. For example, when the access parameter configuration used by wireless devices in a certain traffic situation is adapted to and suitable for that traffic situation, the communication of any messages in the access procedure will be more reliable and successful. Further, any collisions between random access messages transmitted by two or more wireless devices accidently at the same time may be avoided or at least the number of such collisions may be reduced, thereby also reducing the number of retransmissions that need to be made when the access procedure fails.

In one further embodiment, the signalling network node may monitor for random access messages from the at least one wireless device in an area, sector or antenna beam where the at least one wireless device is present, based on the obtained access parameter configuration which is implemented in said area, sector or antenna beam by means of the signalled synchronization signal. A potential advantage of this embodiment is that the signalling network node may be able to distinguish more easily any random access messages transmitted in the area, sector or antenna beam from messages transmitted in other adjacent areas, sectors or antenna beams.

In another possible embodiment, the compressed set of predefined access parameter configurations and the predefined mapping may have been preconfigured in the at least one wireless device, e.g. at manufacture of the device(s) or by signalling at initial connection to the radio network. Alternatively or additionally, the compressed set of predefined access parameter configurations may be broadcasted over the area. The signalled synchronization signal may in some embodiments be associated with properties of a physical channel. These channel properties may comprise at least one of: a physical channel format, a scrambling code and a Cyclic Redundancy Check (CRC) code. Thereby, the wireless device(s) will be able to receive and decode the broadcasted compressed set of predefined access parameter configurations more easily by identifying the channel properties based on the signalled synchronization signal and using these channel properties for receiving and decoding the broadcasted compressed set of predefined access parameter configurations.

An example of how the solution may be employed in terms of actions performed by a wireless device will now be described with reference to the flow chart in FIG. 4C which illustrates how the wireless device, such as the above wireless device 302, may operate to accomplish the functionality described above.

The wireless device is arranged for accessing a radio network in an area where a signalling network node, such as the signalling network node 300, provides radio coverage. The procedure illustrated in FIG. 4C may be performed after the signalling network node has performed the above-described procedure illustrated in FIG. 4B, as indicated by the dashed arrow from action 404. Thus in a next action 406, the wireless device receives from the signalling network node a synchronization signal that is associated with an access parameter configuration comprised in a compressed set of predefined access parameter configurations for accessing the radio network, which synchronization signal was thus transmitted in the foregoing action 404. As mentioned above, different synchronization signals are associated with different access parameter configurations in the compressed set of predefined access parameter configurations according to a predefined mapping between the different synchronization signals and the different access parameter configurations such that a range of said different synchronization signals are jointly mapped to an access parameter in the compressed set of predefined access parameter configurations. The term "predefined mapping" thus implies that the mapping is known to the wireless device.

In a following action 408, the wireless device derives the access parameter configuration from the compressed set of predefined access parameter configurations based on the received synchronization signal and the predefined mapping. A final action 410 illustrates that the wireless device at some point accesses the radio network according to the derived access parameter configuration.

At least some of the above-described embodiments may be used by the wireless device in this procedure as well. Thus in one possible embodiment, the predefined mapping may comprise a table which maps the different synchronization signals to corresponding ones of the different access parameter configurations such that said range of different synchronization signals are mapped to one value of the access parameter or to a sub-table where the synchronization signals comprised in said range of different synchronization signals are mapped to respective values of the access parameter. In another possible embodiment, the predefined mapping may comprise a function of the range of different synchronization signals for determining, for each synchronization signal in said range of different synchronization signals, respective values of the access parameter in the compressed set of predefined access parameter configurations.

In some embodiments, the wireless device may have been preconfigured with the compressed set of predefined access parameter configurations and the predefined mapping. Alternatively or additionally, the wireless device may receive the compressed set of predefined access parameter configurations in broadcasting from a broadcasting network node. The signalled synchronization signal may in that case be associated with properties of a physical channel, said properties comprising at least one of: a physical channel format, a scrambling code and a Cyclic Redundancy Check, CRC, code. Furthermore, the wireless device may receive the synchronization signal in broadcasting or dedicated signalling from the signalling network node.

Figure 5A:
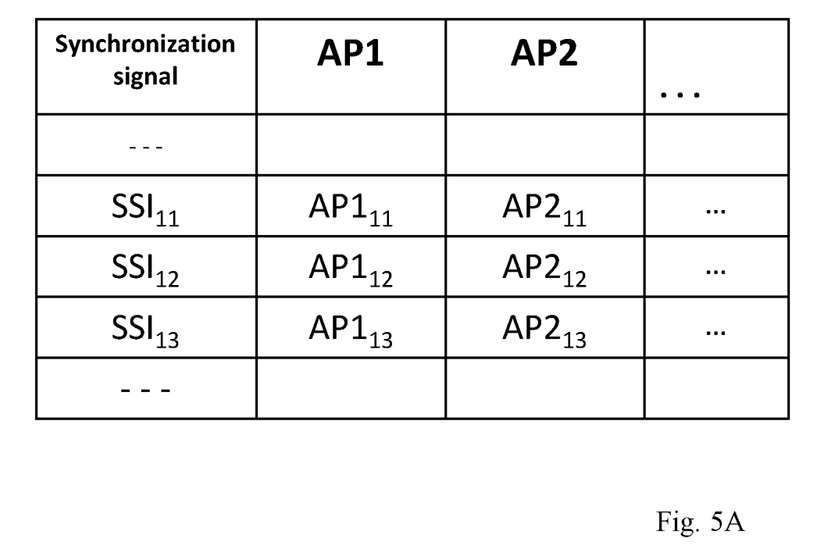
FIG. 5A illustrates an example of a predefined mapping between synchronization signals and associated access parameter configurations by means of a table, according to further possible embodiments.

It was mentioned above that the predefined mapping may comprise a table which maps the different synchronization signals to corresponding associated ones of the different access parameter configurations. An example of how a part of such a table may be configured is shown in FIG. 5A where the synchronization signals are represented by synchronization signal indices denoted $SSI_x$, where x=1, . . . , 11, 12, 13, . . . and access parameters are denoted APn where n=1, 2, . . . . Each synchronization signal index SSI is mapped to a set of access parameters AP1, AP2 . . . . In this example, synchronization signal index $SSI_{11}$ is mapped to a set of access parameter values $AP1_{11}, AP2_{11}$ . . . , synchronization signal $SSI_{12}$ is mapped to a set of access parameter values $AP1_{12}, AP2_{12}$ . . . , synchronization signal $SSI_{13}$ is mapped to a set of access parameter values $AP1_{13}, AP2_{13}$ . . . , and so forth. The synchronization signals in this example are mapped via the respective synchronization signal indices to access parameter values in an uncompressed manner, which mapping may be included in the table in addition to the above-described compressed mapping of a range of synchronization signals to one and the same access parameter value or to a sub-table of access parameter values. The sub-table may have been signalled to the wireless device or preconfigured in the wireless device.

Figure 5B:
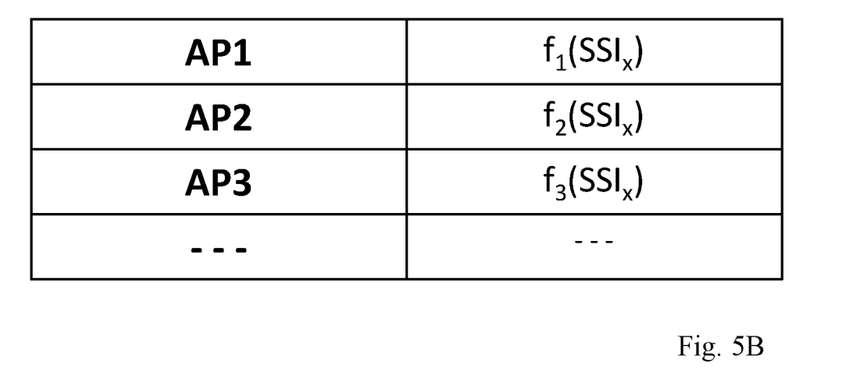
FIG. 5B illustrates an example of a predefined mapping between synchronization signals and associated access parameter configurations by means of functions, according to further possible embodiments.

It was further mentioned above that the predefined mapping may comprise a function of a range of different synchronization signals for determining, for each synchronization signal in the range of different synchronization signals, respective values of the access parameter for respective associated access parameter configurations in the compressed set of predefined access parameter configurations, and that the synchronization signal indices representing the synchronization signals in the range of different synchronization signals may use as an input or argument to the function for determining the respective values of the access parameter for the respective associated access parameter configurations in the compressed set of predefined access parameter configurations. An example of how such a mapping may be realized is shown in FIG. 5B where the synchronization signals in the range of different synchronization signals are represented by synchronization signal indices denoted $SSI_x$ where the different synchronization signals are differentiated by different values of subscript x and the functions are denoted $f_n$ where n=1, 2, 3 . . . . Thus, for an example synchronization signal $SSI_x$ a first access parameter AP1 can be computed as $f_1(SSI_x)$, a second access parameter AP2 can be computed as $f_2(SSI_x)$, a third access parameter AP3 can be computed as $f_3(SSI_x)$, and so forth. Thus in this example, the compression is achieved by using one and the same function for determining different values of a particular access parameter with different synchronization signals as input. In this case it is sufficient to broadcast or preconfigure the function to enable the wireless device to determine the access parameter value by using a synchronization index corresponding to a received synchronization signal as input to the function.

Figure 6A:
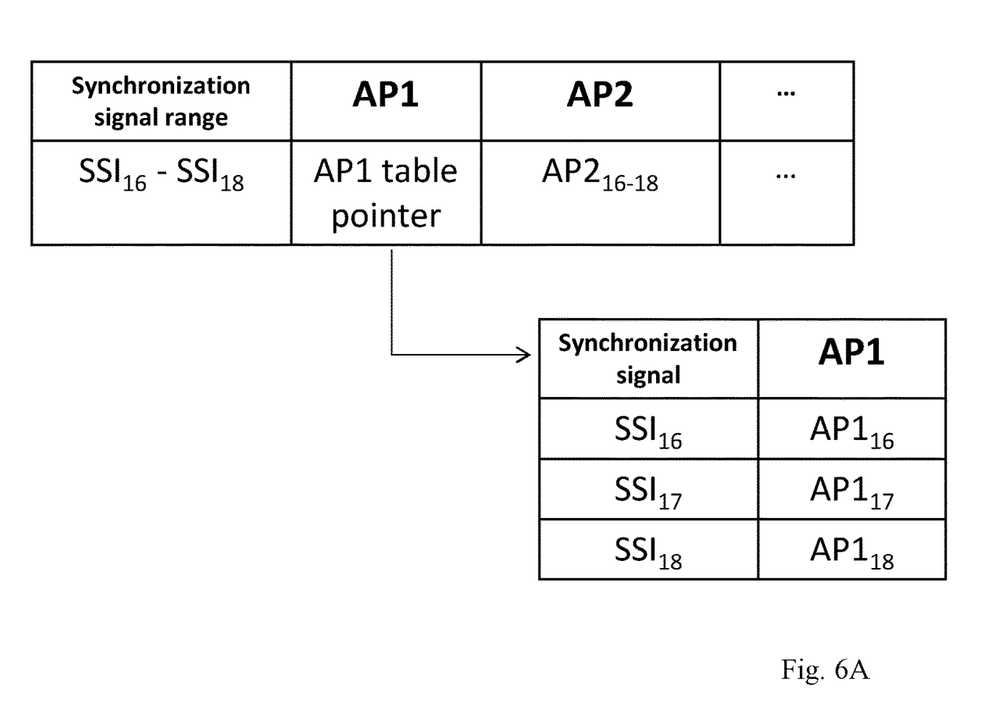
FIG. 6A illustrates another example of a predefined mapping between synchronization signals and associated access parameter configurations by means of a table, according to further possible embodiments.

Another example of how a table for mapping different synchronization signals to different access parameter configurations may be configured is shown in FIG. 6A where the synchronization signals are represented by synchronization signal indices denoted $SSI_x$, where x=1, . . . , 16, 17, 18, . . . and the access parameters are denoted APn where n=1, 2, . . . . This example shows how a range of synchronization signals represented by synchronization signal indices $SSI_{16}$-$SSI_{18}$ can be mapped to different access parameters in a single entry of the table which includes a pointer to a sub-table for mapping the individual synchronization signal indices $SSI_{16}$-$SSI_{18}$ to respective values $AP1_{16}$-$AP1_{18}$ of a first access parameter AP1, while all synchronization signals $SSI_{16}$-$SSI_{18}$ are mapped to one and the same value $AP2_{16\text{-}18}$ of another second access parameter AP2.

Figure 6B:
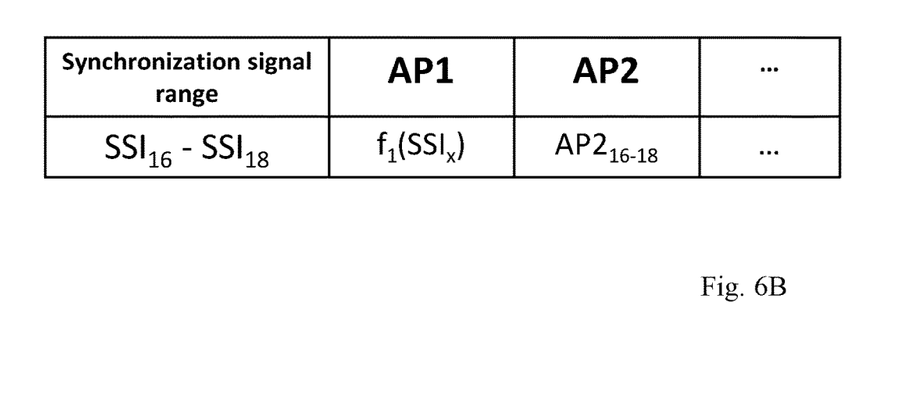
FIG. 6B illustrates another example of a predefined mapping between synchronization signals and associated access parameter configurations by means of functions, according to further possible embodiments.

Another example of how a function of a synchronization signal may be used for determining an access parameter is shown in FIG. 6B where each of a range of synchronization signal indices $SSI_{16}$-$SSI_{18}$ can be used as input to the same function $f_1$ for determining the value of a first access parameter AP1 such that $AP1_x = f_1(SSI_x)$ where SSI is any of $SSI_{16}$-$SSI_{18}$ and $AP1_x$ their respective values $AP1_{18}$-$AP1_{18}$ of the first access parameter AP1. In this example, the value of another second access parameter AP2 is $AP2_{16\text{-}18}$ for the synchronization signals corresponding to synchronization signal indices $SSI_{16}$-$SSI_{18}$ in the range of synchronization signals.

Figure 7:
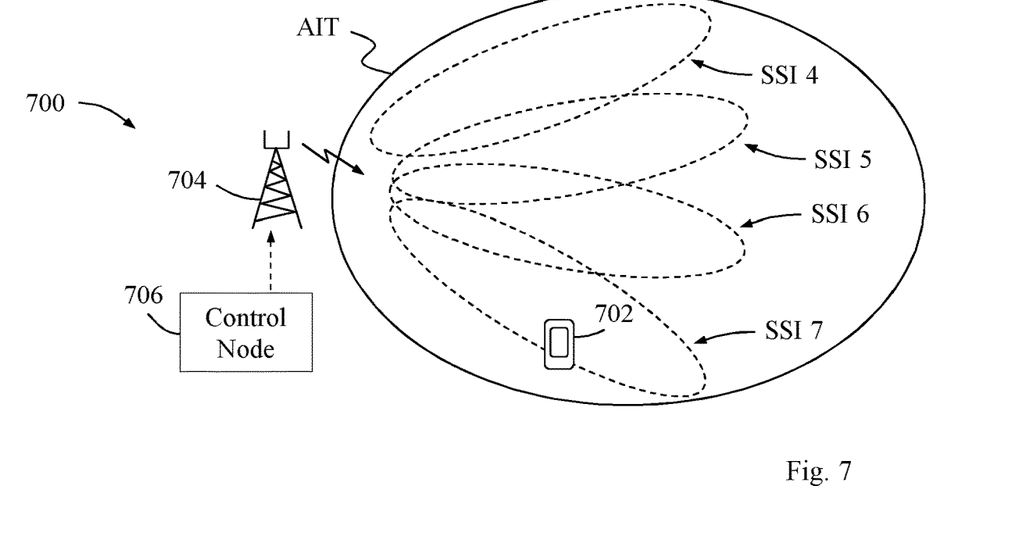
FIG. 7 is a communication scenario illustrating that a signalling network node transmits different synchronization signals, denoted SSIs as an example, over different sectors or antenna beams, according to further possible embodiments.
Figure 8:
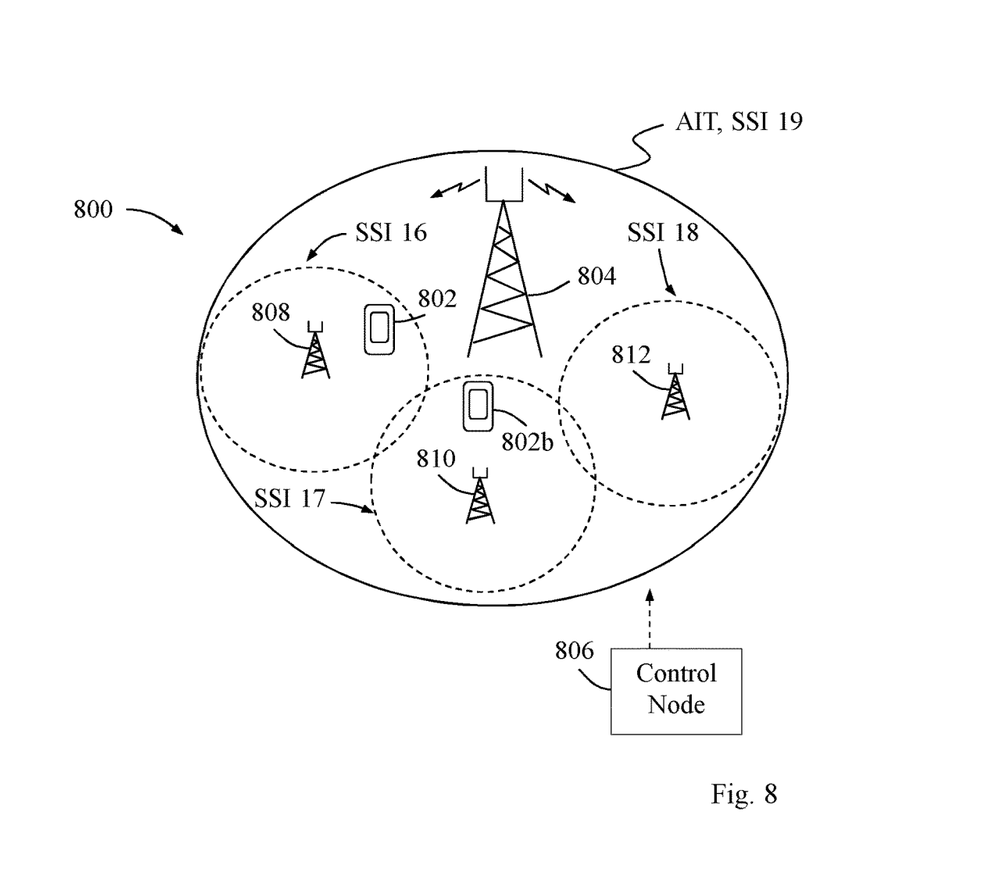
FIG. 8 is another communication scenario illustrating that three signalling network nodes transmit different synchronization signals, denoted SSIs as an example, over different areas, according to further possible embodiments.

It was also mentioned above that different synchronization signals may be signalled in different areas, sectors or antenna beams to implement corresponding associated access parameter configurations in said areas, sectors or antenna beams, so that any wireless device therein is enabled to derive corresponding access related parameters for performing random access in that area. Two examples of this embodiment are shown in FIGS. 7 and 8. In these examples the term "base station" will be used although the term network node could just as well be used in these examples. In FIG. 7, the radio network 700 comprises at least one base station 704 and a control node 706 which controls the base station 704 to broadcast access information and transmit synchronization signals as follows.

The base station 704 broadcasts the access information AIT comprising a compressed set of access parameter configurations over a relatively wide area. The base station 704 also transmits different synchronization signals over smaller sectors or antenna beams within the wide area, namely the signals indicated by SSI 4, SSI 5, SSI 6 and SSI 7, as shown in the figure. Thereby, any wireless device that receives one of these synchronization signals in a certain sector or antenna beam can use the received synchronization signal to derive an access parameter configuration which is valid in that sector or antenna beam. The received synchronization signal may for example be an SSI sequence as described above, which is translated by the wireless device into an SSI, which may in this example be one of SSI 4-7 shown in FIG. 7. For example, a wireless device 702 that receives the synchronization signal corresponding to SSI 7 is thus able to derive an access parameter configuration with valid access parameters therefrom, e.g. according to any of the embodiments described above.

A base station, which is an example of a network node, may for example be equipped with an advanced antenna solution that supports analogue beam-forming in a set of pre-defined directions. In this case it may be an advantage for the base station 704 to know in which beam the wireless device 702 has the best reception for an upcoming downlink transmission from the base station 704, and this can be accomplished already from the random access procedure in the scenario of FIG. 7. Thereby, the base station 704 is able e.g. to transmit a Random Access Response, RAR, to the device 702 only in the downlink beam corresponding to the synchronization signal corresponding to SSI 7 received and used by the wireless device 702. The wireless device 702 may thus indicate which downlink beam is the best by deriving and using random access parameters according to the SSI 7. In this way, interference caused by the RAR can be avoided in the other beams.

The base station may also have a limited capacity to perform base band processing in all different directions simultaneously and it may therefore be desirable to ensure that wireless devices in different downlink beams transmit their RACH preambles exactly when the base station searches for random access transmissions in the corresponding uplink beam. The base station may then be able to perform sequential processing of PRACH in each possible direction. Using the example of FIG. 7 enables uplink reception beam-forming of PRACH while still ensuring good performance of the broadcasting of access information.

In FIG. 8, the radio network 800 comprises a base station 804, which is an example of a network node, such as a macro node covering a wide area, three base stations 808, 810 and 812, which are further examples of network nodes, covering smaller areas within the wide area, and a network node in form of a control node 806 which controls the base stations 804, 808-812 to broadcast access information and transmit synchronization signals as follows.

The base station 804 broadcasts the access information AIT comprising a compressed set of predefined access parameter configurations over a relatively wide area. The base stations 808-812 and 804 transmit different synchronization signals indicated by SSI 16, SSI 17, SSI 18 and SSI 19, respectively, as shown in the FIG. 8. Thereby, any wireless device that receives any of these synchronization signals can derive an access parameter configuration with valid access parameters therefrom, e.g. according to any of the embodiments described above.

For example, a wireless device 802 that receives the synchronization signal corresponding to SSI 16 is thus able to derive an access parameter configuration accordingly. Transmitting the AIT over a large area as in FIG. 8 enables so-called macro diversity gain. However, if the same synchronization signal would also be transmitted over the same large area, additional problems may occur since it may for example require RACH coordination between base station sites. In case the wireless device transmits a RACH preamble, any network node within the area will have a responsibility to ensure that a RAR message is transmitted in response to the wireless device. In case the network nodes cannot coordinate the RAR transmission, the wireless device will likely receive several RAR messages from the network transmitted from different base stations.

One possible way to avoid this may be to transmit a single AIT comprising a compressed set of predefined access parameter configurations from base station 804 in FIG. 8 over the whole large area as shown while different synchronization signals are signalled in the smaller areas covered by the base stations 808-812. The RACH related parameters used by the wireless device 802, such as the RACH-preamble, may in that case depend on which synchronization signal has been received.

Figure 9:
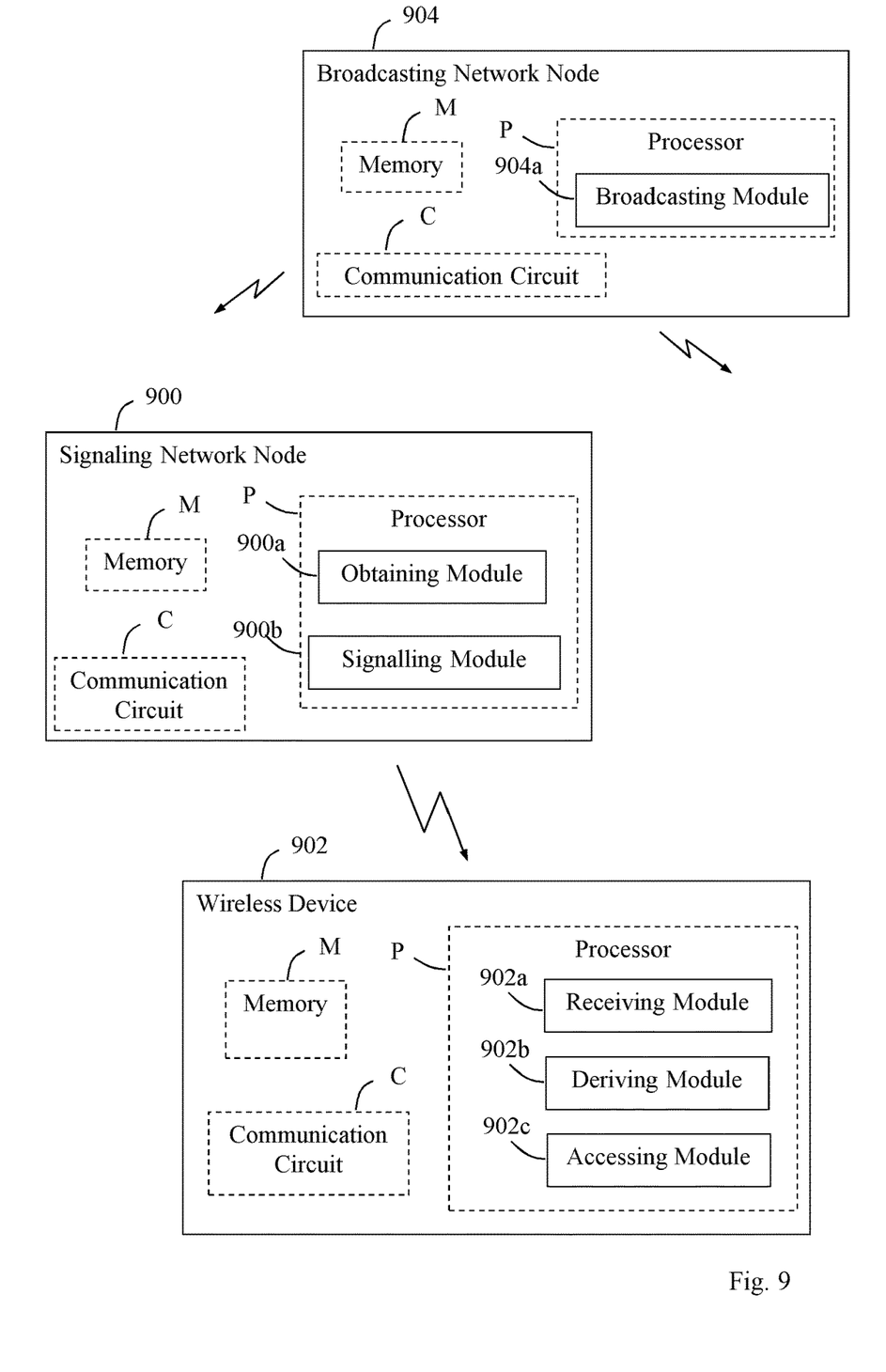
FIG. 9 is a block diagram illustrating signalling and broadcasting network nodes and a wireless device in more detail, according to further possible embodiments.

The block diagram in FIG. 9 illustrates a detailed but non-limiting example of how signalling and broadcasting network nodes 900, 904 of a radio network and a wireless device 902, respectively, may be structured to bring about the above-described solution and embodiments thereof. In this figure, the signalling and broadcasting network nodes 900, 904 and the wireless device 902 may be configured to operate according to any of the examples and embodiments of employing the solution as described above, where appropriate, and as follows. Each of the signalling and broadcasting network nodes 900, 904 and the wireless device 902 is shown to comprise a processor "P", a memory "M" and a communication circuit "C" with suitable equipment for transmitting and receiving signals in the manner described herein.

The communication circuit C in each of the signalling and broadcasting network nodes 900, 904 and the wireless device 902 thus comprises equipment configured for communication over a radio interface using a suitable protocol for radio communication depending on the implementation. The communication circuit C in each of the signalling and broadcasting network nodes 900, 904 may further comprise equipment configured for communication over a backhaul interface using a suitable protocol for communication between these nodes as well as with other network nodes in the network. The solution is however not limited to any specific types of data or protocols.

Figure 4B:
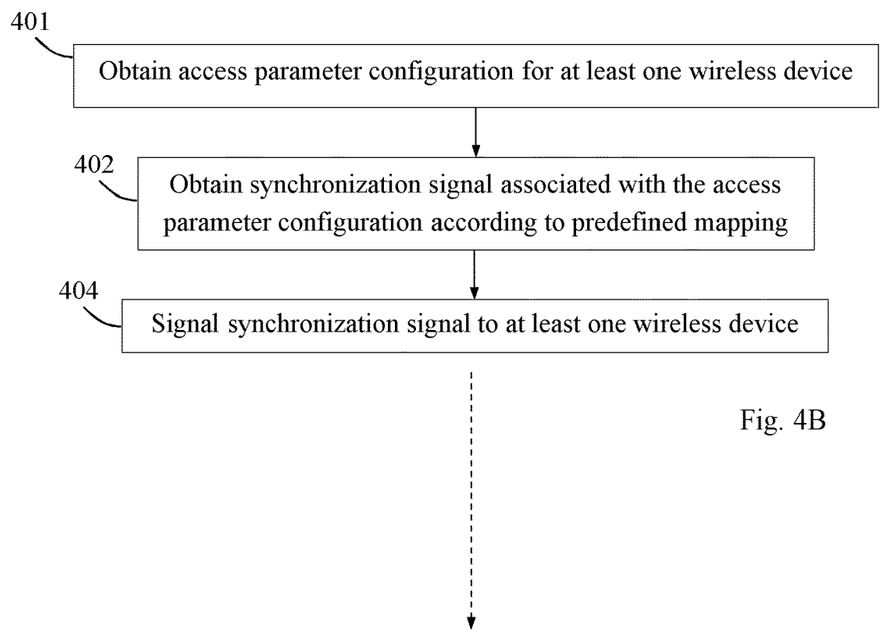
FIG. 4B is a flow chart illustrating a procedure in a signalling network node, according to further possible embodiments.
Figure 4C:
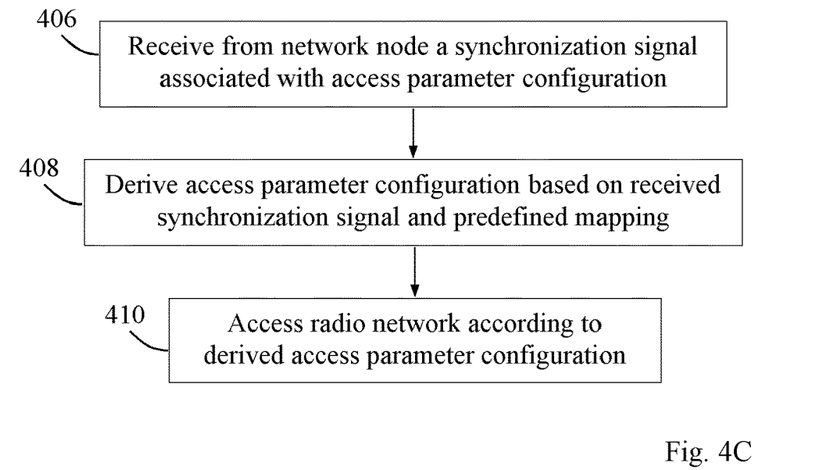
FIG. 4C is a flow chart illustrating a procedure in a wireless device, according to further possible embodiments.

The signalling network node 900 comprises means configured or arranged to perform the actions 401-404 of the flow chart in FIG. 4B in the manner described above. The broadcasting network node 904 comprises means configured or arranged to perform the action 400 of the flow chart in FIG. 4A in the manner described above. Further, the wireless device 902 comprises means configured or arranged to perform the actions 406-410 of the flow chart in FIG. 4C in the manner described above. The actions of FIGS. 4A, 4B and 4C may be performed by means of functional modules in the respective processor P in the signalling and broadcasting network nodes 900, 904 and the wireless device 902.

The signalling network node 900 is arranged to control operation of at least one wireless device 902 accessing a radio network in an area where the signalling network node 900 provides radio coverage. The signalling network node 900 may thus comprise a processor P and a memory M, said memory comprising instructions executable by said processor, whereby the signalling network node 900 is operative as follows.

The signalling network node 900 is operative to obtain an access parameter configuration, which access parameter configuration is to be used by the at least one wireless device 902 for accessing the radio network, wherein different synchronization signals are associated with different access parameter configurations in the compressed set of predefined access parameter configurations according to a predefined mapping between the different synchronization signals and the different access parameter configurations such that a range of said different synchronization signals are jointly mapped to an access parameter in the compressed set of predefined access parameter configurations. This operation may be performed by an obtaining module 900a in the signalling network node 900, e.g. in the manner described for action 401 above.

The signalling network node 900 is also operative to obtain a synchronization signal that is associated with the access parameter configuration according to said predefined mapping. This operation may be performed by the obtaining module 900a, e.g. in the manner described for action 402 above. The signalling network node 900 is also operative to signal the obtained synchronization signal to the at least one wireless device 902, to enable the at least one wireless device 902 to derive said access parameter configuration from the compressed set of predefined access parameter configurations based on the signalled synchronization signal and said predefined mapping. This operation may be performed by a signalling module 900b, e.g. in the manner described for action 404 above.

The broadcasting network node 904 is arranged to control operation of at least one wireless device 902 accessing a radio network in an area where a signalling network node 900 provides radio coverage. The broadcasting network node 904 may thus comprise a processor P and a memory M, said memory comprising instructions executable by said processor, whereby the broadcasting network node 904 is operative as follows.

The broadcasting network node 904 is operative to broadcast a compressed set of predefined access parameter configurations, wherein different synchronization signals are associated with different access parameter configurations in the compressed set of predefined access parameter configurations according to a predefined mapping between the different synchronization signals and the different access parameter configurations such that a range of said synchronization signals are jointly mapped to an access parameter in the compressed set of predefined access parameter configurations. This operation may be performed by a broadcasting module 904a in the broadcasting network node 904, e.g. in the manner described for action 400 above.

The wireless device 902 is arranged to access a radio network in an area where a signalling network node 900 provides radio coverage. The wireless device 902 may thus comprise a processor P and a memory M, said memory comprising instructions executable by said processor whereby the wireless device 902 is operative as follows.

The wireless device 902 is operative to receive from the signalling network node 900 a synchronization signal that is associated with an access parameter configuration comprised in a compressed set of predefined access parameter configurations for accessing the radio network, wherein different synchronization signals are associated with different access parameter configurations in the compressed set of predefined access parameter configurations according to a predefined mapping between the different synchronization signals and the different access parameter configurations such that a range of said different synchronization signals are jointly mapped to an access parameter in the compressed set of predefined access parameter configurations. This receiving operation may be performed by a receiving module 902a in the wireless device 902, e.g. in the manner described for action 406 above.

The wireless device 902 is also operative to derive said access parameter configuration from the compressed set of predefined access parameter configurations based on the received synchronization signal and the predefined mapping. This operation may be performed by a deriving module 902b, e.g. in the manner described for action 408 above. The wireless device 902 is also operative to access the radio network according to the derived access parameter configuration. This operation may be performed by an accessing module 902c in the wireless device 902, e.g. in the manner described for action 410 above.

It should be noted that FIG. 9 illustrates various functional modules in the signalling and broadcasting network nodes 900, 904 and the wireless device 902, respectively, and the skilled person is able to implement these functional modules in practice using suitable software and hardware. Thus, the solution is generally not limited to the shown structures of the signalling and broadcasting network nodes 900, 904 and the wireless device 902, and the functional modules 900a-b, 904a and 902a-c therein may be configured to operate according to any of the features and embodiments described in this disclosure, where appropriate.

The functional modules 900a-b, 904a and 902a-c described above can be implemented in the signalling and broadcasting network nodes 900, 904 and the wireless device 902, respectively, by means of program modules of a respective computer program comprising code means which, when run by the processor P causes the signalling and broadcasting network nodes 900, 904 and the wireless device 902 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the signalling and broadcasting network nodes 900, 904 and the wireless device 902 in the form of a memory having a computer readable medium and being connected to the processor P. The computer program product or memory M in each of the signalling and broadcasting network nodes 900, 904 and the wireless device 902 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective signalling and broadcasting network nodes 900, 904 and wireless device 902.

The solution described herein may be implemented in each of the signalling and broadcasting network nodes 900, 904 and the wireless device 902 by a computer program comprising instructions which, when executed on at least one processor, cause the at least one processor to carry out the actions according to any of the above embodiments, where appropriate. The solution may also be implemented at each of the signalling and broadcasting network nodes 900, 904 and the wireless device 902 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "wireless device", "access parameter", "access parameter configuration", "synchronization signal" and "predefined mapping" have been used throughout this disclosure, although any other corresponding entities, functions, and/or parameters could also be used having the features and characteristics described herein. The solution is defined by the appended claims.

The invention claimed is:

1. A method performed by a base station of a radio network, for controlling operation of at least one user equipment (UE) accessing the radio network in an area where the base station provides radio coverage, the method comprising:
    obtaining an access parameter configuration, which access parameter configuration is to be used by the at least one UE for accessing the radio network, wherein different synchronization signals are associated with different access parameter configurations in a compressed set of predefined access parameter configurations according to a predefined mapping between the different synchronization signals and the different access parameter configurations such that a range of said different synchronization signals are jointly mapped to an access parameter in the compressed set of predefined access parameter configurations,
    obtaining a synchronization signal that is associated with the obtained access parameter configuration according to said predefined mapping, and
    signaling the obtained synchronization signal to the at least one UE, to enable the at least one UE to derive said access parameter configuration from the compressed set of predefined access parameter configurations based on the signaled synchronization signal and said predefined mapping.

2. The method of claim 1, wherein the obtained access parameter configuration has been selected depending on a current traffic situation in the area.

3. The method of claim 1, wherein different synchronization signals are signaled in different areas, sectors or antenna beams to implement corresponding associated access parameter configurations in said areas, sectors or antenna beams.

4. A non-transitory computer-readable medium comprising, stored thereupon, a computer program comprising instructions that, when executed on at least one processor of a base station, cause the at least one processor to carry out the method of claim 1.

5. A base station arranged to control operation of at least one user equipment (UE) accessing a radio network in an area where the base station provides radio coverage, the base station comprising:
    a communication circuit; and
    a processing circuit operatively coupled to the communication circuit and configured to:
        obtain an access parameter configuration, which access parameter configuration is to be used by the at least one UE for accessing the radio network, wherein different synchronization signals are associated with different access parameter configurations in a compressed set of predefined access parameter configurations according to a predefined mapping between the different synchronization signals and the different access parameter configurations such that a range of said different synchronization signals are jointly mapped to an access parameter in the compressed set of predefined access parameter configurations,
        obtain a synchronization signal that is associated with the access parameter configuration according to said predefined mapping, and
        signal the obtained synchronization signal to the at least one UE, using the communication circuit, to enable the at least one UE to derive said access parameter configuration from the compressed set of predefined access parameter configurations based on the signaled synchronization signal and said predefined mapping.

6. The base station of claim 5, wherein the obtained access parameter configuration has been selected depending on a current traffic situation in the area.

7. The base station of claim 5, wherein different synchronization signals are signaled in different areas, sectors or antenna beams to implement corresponding associated access parameter configurations in said areas, sectors or antenna beams.

8. The base station of claim 7, wherein the base station is configured to monitor for random access messages from the at least one UE in an area, sector or antenna beam where the at least one UE is present, based on the obtained access parameter configuration which is implemented in said area, sector or antenna beam by means of the signaled synchronization signal.

9. The base station of claim 5, wherein the compressed set of predefined access parameter configurations are broadcasted over the area.

10. The base station of claim 5, wherein the base station is configured to signal the obtained synchronization signal to the at least one UE by broadcasting or by dedicated signaling.

11. A method performed by a user equipment (UE), for accessing a radio network in an area where a base station provides radio coverage, the method comprising:
  receiving from the base station a synchronization signal that is associated with an access parameter configuration comprised in a compressed set of predefined access parameter configurations for accessing the radio network, wherein different synchronization signals are associated with different access parameter configurations in the compressed set of predefined access parameter configurations according to a predefined mapping between the different synchronization signals and the different access parameter configurations such that a range of said different synchronization signals are jointly mapped to an access parameter in the compressed set of predefined access parameter configurations,
  deriving said access parameter configuration from the compressed set of predefined access parameter configurations based on the received synchronization signal and the predefined mapping, and
  accessing the radio network according to the derived access parameter configuration.

12. The method of claim 11, wherein said predefined mapping comprises a table mapping the different synchronization signals to corresponding ones of the different access parameter configurations such that said range of different synchronization signals are mapped to one value of the access parameter or to a sub-table where the synchronization signals comprised in said range of different synchronization signals are mapped to respective values of the access parameter.

13. The method of claim 11, wherein said predefined mapping comprises a function of the range of different synchronization signals for determining, for each synchronization signal in said range of different synchronization signals, respective values of the access parameter in the compressed set of predefined access parameter configurations.

14. The method of claim 11, wherein the UE has been preconfigured with the compressed set of predefined access parameter configurations and the predefined mapping.

15. The method of claim 11, wherein the UE receives the compressed set of predefined access parameter configurations in broadcasting from a broadcasting base station.

16. The method of claim 11, wherein the UE receives the synchronization signal in broadcasting or dedicated signaling from the base station.

17. A non-transitory computer-readable medium comprising, stored thereupon, a computer program comprising instructions that, when executed on at least one processor of a UE, cause the at least one processor to carry out the method of claim 11.

18. A user equipment (UE) arranged to access a radio network in an area where a base station provides radio coverage, the UE comprising:

a communication circuit; and
  a processing circuit operatively coupled to the communication circuit and configured to:
    receive from the base station, via the communication circuit, a synchronization signal that is associated with an access parameter configuration comprised in a compressed set of predefined access parameter configurations for accessing the radio network, wherein different synchronization signals are associated with different access parameter configurations in the compressed set of predefined access parameter configurations according to a predefined mapping between the different synchronization signals and the different access parameter configurations such that a range of said different synchronization signals are jointly mapped to an access parameter in the compressed set of predefined access parameter configurations,
    derive said access parameter configuration from the compressed set of predefined access parameter configurations based on the received synchronization signal and the predefined mapping, and
    access the radio network according to the derived access parameter configuration, using the communication circuit.

19. The UE of claim 18, wherein said predefined mapping comprises a table mapping the different synchronization signals to corresponding ones of the different access parameter configurations such that said range of different synchronization signals are mapped to one value of the access parameter or to a sub-table where the synchronization signals comprised in said range of different synchronization signals are mapped to respective values of the access parameter.

20. The UE of claim 18, wherein said predefined mapping comprises a function of the range of different synchronization signals for determining, for each synchronization signal in said range of different synchronization signals, respective values of the access parameter in the compressed set of predefined access parameter configurations.

21. The UE of claim 18, wherein the UE has been preconfigured with the compressed set of predefined access parameter configurations and the predefined mapping.

22. The UE of claim 18, wherein the UE is configured to receive the compressed set of predefined access parameter configurations in broadcasting from a broadcasting base station.

23. The UE of claim 18, wherein the UE is configured to receive the synchronization signal in broadcasting or dedicated signaling from the base station.

24. A method performed by a broadcasting base station of a radio network, for controlling operation of at least one UE accessing the radio network in an area where a signaling base station provides radio coverage, the method comprising:
  broadcasting a compressed set of predefined access parameter configurations, wherein different synchronization signals are associated with different access parameter configurations in the compressed set of predefined access parameter configurations according to a predefined mapping between the different synchronization signals and the different access parameter configurations such that a range of said synchronization signals are jointly mapped to an access parameter in the compressed set of predefined access parameter configurations.

25. A broadcasting base station arranged to control operation of at least one user equipment (UE) accessing a radio network in an area where a signaling base station provides radio coverage, the broadcasting base station comprising:
- a communication circuit; and
- a processing circuit operatively coupled to the communication circuit and configured to:
  - broadcast a compressed set of predefined access parameter configurations, wherein different synchronization signals are associated with different access parameter configurations in the compressed set of predefined access parameter configurations according to a predefined mapping between the different synchronization signals and the different access parameter configurations such that a range of said synchronization signals are jointly mapped to an access parameter in the compressed set of predefined access parameter configurations.

* * * * *